(12) United States Patent
Granic

(10) Patent No.: US 10,573,283 B2
(45) Date of Patent: Feb. 25, 2020

(54) DEVICE FOR SUPPORTING A SAXOPHONE

(71) Applicant: Mateo Granic, Nashville, TN (US)

(72) Inventor: Mateo Granic, Nashville, TN (US)

( * ) Notice: Subject to any disclaimer, the term of this patent is extended or adjusted under 35 U.S.C. 154(b) by 0 days.

(21) Appl. No.: 16/253,659

(22) Filed: Jan. 22, 2019

(65) Prior Publication Data
US 2019/0228752 A1    Jul. 25, 2019

(30) Foreign Application Priority Data

Jan. 23, 2018 (AT) .................................. 23/2018

(51) Int. Cl.
*G10G 5/00*  (2006.01)
*B62K 5/10*  (2013.01)
*G10D 7/08*  (2006.01)
*G10D 3/18*  (2020.01)

(52) U.S. Cl.
CPC ............ *G10G 5/005* (2013.01); *B62K 5/10* (2013.01); *G10D 3/18* (2013.01); *G10D 7/08* (2013.01)

(58) Field of Classification Search
CPC ............ G10G 5/005; B62K 5/10; G10D 3/18
USPC ........................................................ 84/385 R
See application file for complete search history.

(56) References Cited

U.S. PATENT DOCUMENTS

| | | | | |
|---|---|---|---|---|
| 1,932,800 A * | 10/1933 | Myers | ...... | G10G 5/00 84/385 R |
| 2,232,151 A * | 2/1941 | Trew | ...... | G10D 7/08 84/385 R |
| 2,262,556 A * | 11/1941 | Richmond | ...... | G10G 5/00 84/385 R |
| 3,192,817 A * | 7/1965 | Schmidt | ...... | G10G 5/00 84/327 |
| 4,145,950 A * | 3/1979 | Glantz | ...... | G10G 5/00 84/385 R |
| 5,664,758 A * | 9/1997 | Smith | ...... | G10D 9/00 248/688 |
| 6,265,649 B1 * | 7/2001 | Smeding | ...... | G10D 9/043 84/385 P |
| 6,504,087 B2 * | 1/2003 | Shulman | ...... | G10D 7/10 84/327 |
| 8,969,695 B1 * | 3/2015 | Fernandez | ...... | G10D 9/04 84/385 R |
| 9,524,705 B2 * | 12/2016 | Pittel | ...... | G10D 9/00 |
| 2016/0071502 A1 * | 3/2016 | Pittel | ...... | G10G 5/005 84/380 R |
| 2017/0262016 A1 * | 9/2017 | Janowski | ...... | G06F 1/163 |
| 2019/0228752 A1 * | 7/2019 | Granic | ...... | B62K 5/10 |

FOREIGN PATENT DOCUMENTS

| | | | | |
|---|---|---|---|---|
| CN | 207009066 U | * | 2/2018 | |
| DE | 4441288 A1 | * | 6/1995 | ............ G10G 5/005 |
| DE | 4441288 A1 | | 6/1995 | |
| GB | 2570361 A | * | 7/2019 | ............ G10G 5/005 |

* cited by examiner

*Primary Examiner* — David S Warren
*Assistant Examiner* — Christina M Schreiber

(57) ABSTRACT

A device (13) for supporting a saxophone (30) on the body of a player, comprising a rod whose first end-piece features a mechanical adapter for connection to the saxophone, wherein the second end of the rod is connected to a plate via a ball joint or a universal joint, and wherein the mechanical adapter has a felt bumper as impact protection for mechanical parts of the saxophone.

7 Claims, 4 Drawing Sheets

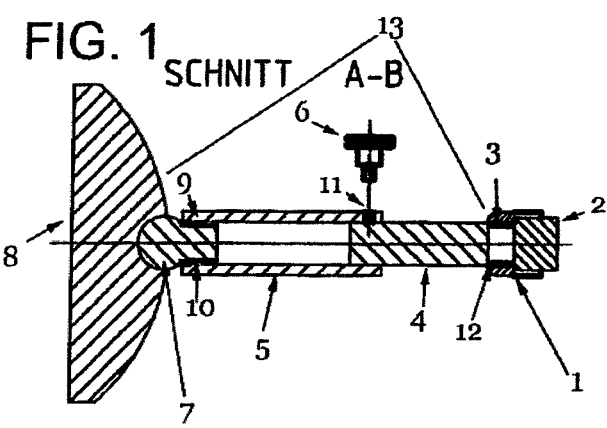
FIG. 1
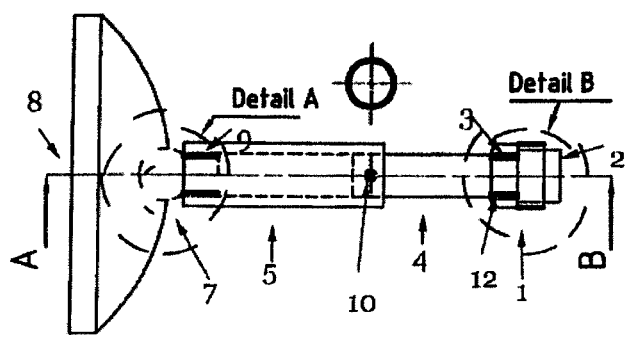
FIG. 2
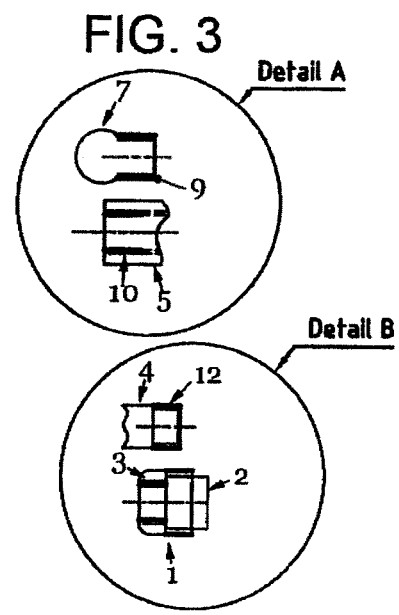
FIG. 3
FIG. 4

DEVICE FOR SUPPORTING A SAXOPHONE

BACKGROUND OF THE INVENTION

The invention relates to a device for supporting a saxophone on the player's body, consisting of a rod whose first end features a mechanical adapter for connecting to the saxophone. Existing devices for supporting a saxophone are attached to the instrument by means of a complex attachment.

The saxophone is usually carried by the neck using a harness. Furthermore, with other harnesses, as well as with different shoulder harnesses and comfort straps, the same problem occurs with existing saxophone support technology. The entire right hand and especially the affected thumb, which is positioned on the thumb rest, are strained in a manner that is unfavorable for playing. The alto saxophone is supported and balanced with the lower part, with the Eb key guard directly on the body, either on the abdomen on the right pelvis at hip level or centered on the abdomen (when played with a shoulder strap). Shorter people support the weight of the instrument or shift it onto the right thigh by shifting the leg slightly forward. When the instrument touches the body, its entire resonance is muffled. In addition, since the saxophone is supported on the body precisely with the Eb key guard, this tone itself is also muffled and has intonation problems accordingly. In terms of intonation, the tone is deeper and does not resonate and radiate freely, but rather is muffled.

This disadvantage can be identified in DE4441288A1, because the complex attachment system with a pelvic support mechanism—which consists of a 10 mm bracket and a tongue—is attached to the Eb key guard. As a result, the Eb tone and tone holes are also muffled, which causes even more serious intonation problems due to the lower or covered Eb tone opening. In terms of intonation, this causes the tone frequency to be distorted downward. The same problem is created in the method of U.S. Pat. No. 1,932,800, which shows a knee support for a saxophone. Often saxophonists push the instrument forward with their right thumb, which is positioned on the thumb rest, in order to avoid touching the instrument with their torso, as well as to improve posture and intonation. This causes another problem, however, because it places stress on the right hand and right arm. Not only does this place additional stress on the finger joints, but also on various different arm muscles, due to the fact that the corresponding force must be used in order to press the saxophone forward. As a result, the player's dexterity endures extreme and unnecessary stress. If, on the other hand, the saxophone is supported on the body with the Eb key guard, the right arm is either too close to the right lower abdomen, or even touches or rests on the side of the lower abdomen, which in turn negatively affects playing comfort. This disadvantage is clearly identified in DE4441288A1, since the saxophone is fixed in the middle with a cross shoulder strap and pelvic support (drawings, page 1, sheet 1 of the respective patent). Within the scope of DE4441288A1, the instrument itself is positioned and fixed only in the middle of the lower abdomen at the hip above the pubis when the player is standing. This positioning of the alto saxophone in the middle of the abdomen basically amounts to a faulty posture technique, as explained below.

The positioning of the saxophone in the middle of the abdomen or above the pubis on the body fundamentally constitutes a wrong posturing technique for the alto saxophone, since the alto saxophone should never be positioned in the middle when the player is standing: "In the standing position you must also let the saxophone come to you. Notice that the instrument rests against the right front part of the player's body. This gives another point for balancing the saxophone so that it will be stable while you are standing and playing." (Rousseau, Eugene; in collaboration with Ployhar, James D.; Practical Hints on playing the Alto Saxophone; 1983, L. A. Belwin-Mills Publishing Corp. by Warner Bros. Publication U.S. INC.)

Or even:

"Shift the instrument as far to the right as necessary to bring your head and neck to the direct center of your body. Be sure that the right shoulder does not lie further back than the left one when you put your right hand on the instrument." (Lindmann, Henry; Method, Seite 9; 1939 by Mils Music, Inc., 1619 Broadway, New York 19, N.Y.)

Due to the central positioning of the alto saxophone on the abdomen, the right arm comes into contact with the body, which causes it to be tense and strained.

This also occurs when the instrument is positioned on the right side of the abdomen on the pelvis at hip level. As a result, the left and right shoulders do not remain in an upright straight line. This disadvantage is also clearly shown in U.S. Pat. No. 3,192,817, because, according to this patent, the holder is positioned only in the middle of the breast.

Another disadvantage of U.S. Pat. No. 3,192,817 is that there is a rigid connector at both ends of the holder rod, rendering it unsuitable and impractical for an adjustment of the angle and positioning of the alto saxophone on the right side at hip level, on the pelvis, or on the thigh. This disadvantage of not being able to adjust the angle left or right can also be identified in US2016071502. It is only possible to adjust the positioning of the holder either up or down. Another disadvantage of patent US2016071502 is that the holder is fastened and screwed to the body of the instrument by means of a plate. This makes it unnecessary, as it is an extra insulation plate that affects the resonance of the instrument. It makes the sound less vibrating and less free, which is to say that it insulates the entire corpus resonance.

In addition, with conventional saxophone holding technology, the left thumb on the thumb rest constantly presses the saxophone forward over the left thumb, in order to hold the saxophone and the embouchure with the upper front teeth onto the mouthpiece. This permanent pressure on the left thumb also places unnecessary strain on the entire left arm and arm muscles. Another disadvantage of DE4441288A1 is the embouchure. With this suspension and pelvic support, pressure is transmitted through the mouthpiece to the lower jaw instead of to the upper jaw and front teeth. As a result, pressure is exerted in the wrong direction, i.e. the reverse and incorrect direction of the embouchure conventionally used; this is due to the fact that the pressure is actually supposed to go to the upper jaw and the upper front teeth, and not to the lower jaw.

For this reason and for the reason that in the DE4441288A1, wherein the saxophone is positioned in the middle of the abdomen or above the pubis on the body by means of pelvic support, it is therefore clear that the method of DE4441288A1 does not provide any remedy for the disadvantages mentioned.

BRIEF SUMMARY OF THE INVENTION

This invention aims to provide a device as mentioned above, which overcomes the disadvantages of the prior technology and which is as small as possible, inexpensive to produce, individually adjustable, and easy to install. Furthermore, in accordance with the invention, the device intends to achieve the standard ergonomics for playing the saxophone, a low weight, and the lowest possible effect on the sound and vibration of the instrument.

In accordance with the invention, the device achieves this by virtue of the fact that the mechanical adapter constitutes a bumper adjustment screw adapter that provides a detachable connection to the first end of the rod, wherein the bumper adjustment screw adapter features a felt bumper on its end, facing away from the rod to serve as impact protection for mechanical parts of the saxophone, and wherein a second end of the rod is connected to a plate via a ball joint or a universal joint.

A preferred embodiment of the invention is characterized in that the mechanical adapter features an external thread by means of which the device can be connected to the internal thread of the bumper adjustment screw adapter of an Eb key guard of a saxophone.

In one embodiment, the mechanical adapter is designed as a plug by means of which the device can be connected to a corresponding connector socket of the bumper adjustment screw adapter of an Eb key guard of a saxophone.

In a further embodiment, the plug and/or the bumper adjustment screw adapter features a magnet.

In a further embodiment of the invention, the rod is inserted into a tube by means of sliding, wherein the position of the rod can be fixed within the tube by a clamping screw that is mounted on the tube in order to produce a telescopically adjustable connection between the plate and the mechanical adapter.

In a preferred embodiment of the invention, the plate has a support pad that preferably consists of felt, rubber, silicone, or a mixture thereof.

A preferred embodiment of the device is characterized by a felt bumper made of felt.

BRIEF DESCRIPTION OF THE SEVERAL VIEWS OF THE DRAWING

The invention is explained below in greater detail based on examples of embodiments shown in the drawings.

FIG. 1 shows a sectional view of the device in section A-B,

FIG. 2 shows a side view of the device according to the invention,

FIG. 3 shows detail A of FIG. 1,

FIG. 4 shows detail B of FIG. 2,

DETAILED DESCRIPTION OF THE INVENTION

Figure 5:
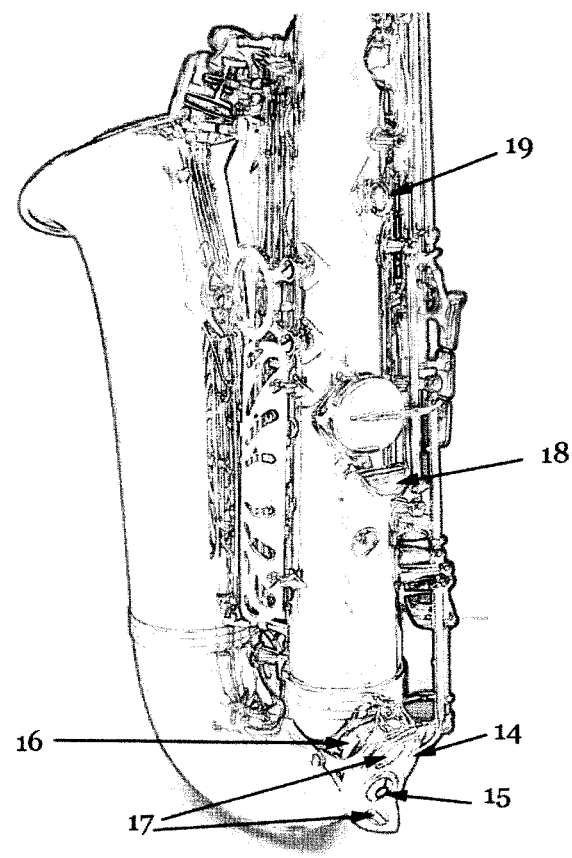
FIG. 5 shows a schematic representation of the lower part of the alto saxophone in the side view from the left.
Figure 6:
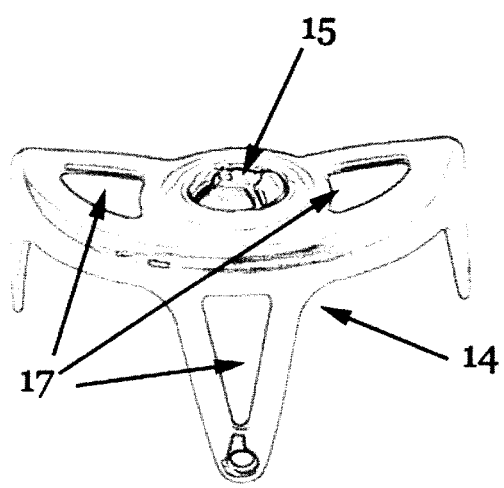
FIG. 6 shows a schematic representation of the key guard and the bumper adjustment screw.

The device (13) described here is a saxophone playing aid according to FIG. 1 that acts as a saxophone support device primarily for standing players of alto and curved soprano saxophones. In addition to all conventional harnesses and comfort straps, it is attached to the saxophone as a supportive add-on mechanism, and in case of all modern saxophones, it is screwed on at the key guard (14) of the Eb key (16) in place of the bumper adjustment screw (15) according to FIG. 5. The existing bumper adjustment screw (15) of the Eb key (16) is unscrewed and in its place, the device (13) is instead screwed on by means of the bumper adjustment screw adapter (1), rendering it an extension of the holder for supporting the saxophone.

Hence, the device (13) or the end-piece facing the saxophone (30) additionally has the same function as the bumper adjustment screw (15) of the Eb key (16) with felt bumpers (2).

For vintage saxophones (built before or around 1935) and all other saxophones that do not feature such a bumper adjustment screw (15) at the key guard (14) of the Eb key (16), a modification is possible by using a three-cleat mechanism to attach the saxophone playing aid to the key guard of the Eb key.

In order to obtain a saxophone playing aid that is easy to manage and reliable, the device (13) according to FIG. 1 features a rod (4) that is inserted into a tube (5) to provide a telescopic connection between a plate (8) and a mechanical adapter on the other side of the rod (4). The rod (4) can be slid smoothly into the tube (5) and fixed by means of a setting screw (6) that is attached to the tube (5) through the inner thread (11) according to the individual wishes and measurements of the player. The tube (5) is connected to the plate (8) by a ball joint, or alternatively, a universal joint (7), to achieve individual adjustability in this position as well. Meanwhile, when the plate is a non-pivotable position, the plane of the plate (8) is perpendicular to the longitudinal axis of the rod (4). Typically, the plate (8) can be pivoted within a small angle range and can also remain pivotable while the instrument is being played to provide comfortable support to the player. To ensure better wearing comfort, the plate (8) consists of a support pad in its entirety, or is equipped with a support pad or a piece of felt. Preferably, the material that is used should have non-slip properties, such as silicone or rubber, or a mixture of silicone and rubber.

The ball joint (7), which is screwed into a matching internal thread (10) on the tube (5), can be attached via an external thread (9).

Figure 7:
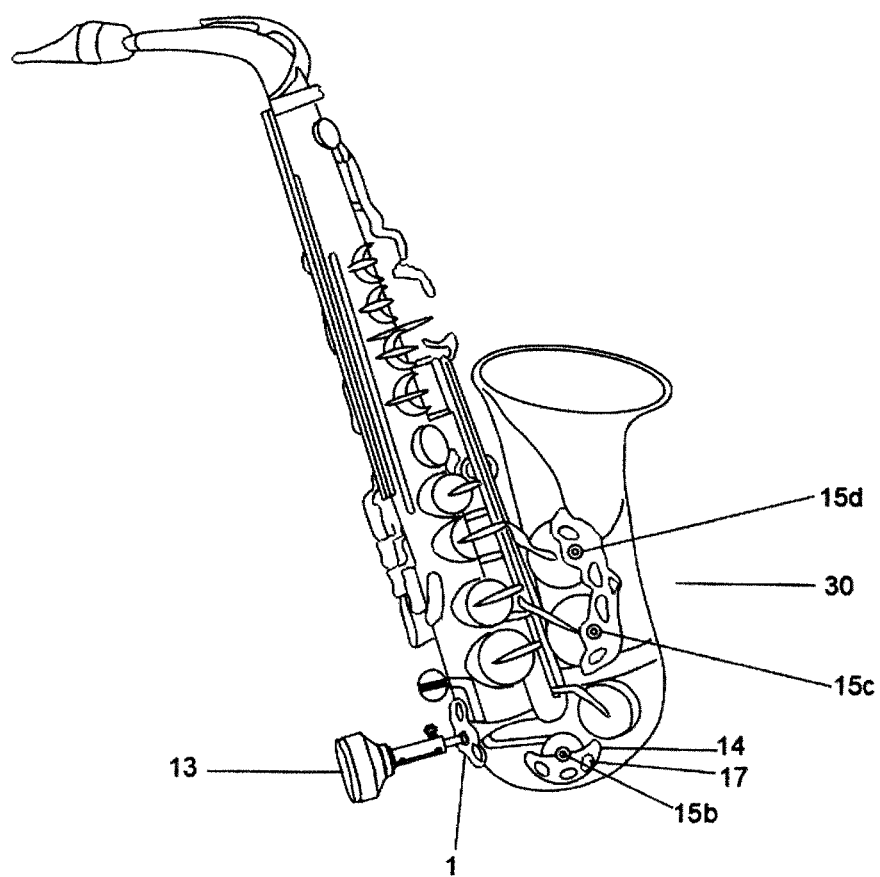
FIG. 7 shows a schematic representation of an alto saxophone in a side view from the right.

Furthermore, the rod (4) according to FIGS. 1 to 4 at the opposite end—here referred to as the "first end"—features a mechanical adapter for connection to parts of the saxophone. Here, it is surprisingly advantageous that an alto saxophone (30) (see FIGS. 5 and 7) has a suitably located Eb key guard (14), which in turn has a bumper adjustment screw (15) that can be removed and replaced by the mechanical adapter of the device (13). The saxophone features three additional adjustment screws, namely, at the low C key guard (15b), at the low B key guard (15c), and at the low Bb key guard (15d). A further surprising advantage is that mechanical elements, such as the device (13), when connected to the bumper adjustment screw adapter (1), have no negative effect on the sound or intonation of the saxophone when played. This advantage is produced by the geometry of the Eb key guard (14), which is connected to the body of the saxophone (30) at three discrete points, and which, for its part, also features tone holes (17) so that the tone development and its overall resonance is not muffled. Now the first end of the rod (4) has a bumper adjustment screw adapter (1), by means of which the rod (4), or the device (13) as a whole—instead of the bumper adjustment screw—(15) can be connected securely to the Eb key guard (14) of the saxophone (30). For this purpose, the bumper adjustment screw adapter (1) has an external thread and additionally a felt bumper (2) according to FIGS. 1, 2, and 4, to cushion any impact of the Eb key (16) (see FIG. 5).

The bumper adjustment screw adapter (1) can be connected to an external thread (12) of the rod (4) via an internal thread (3). The device (13) allows the support to be attached very easily by means of the bumper adjustment screw adapter (1) instead of the original bumper adjustment screw (15) in the key guard (14) of the Eb key (16).

As can be seen in FIG. 5, a saxophone (30) has a harness ring (19), which may still be used, and a thumb rest (18) for the right hand. However, according to FIG. 7, if the device (13) is used together with the saxophone (30), the saxophone (30) no longer has to be held or supported by the right thumb on the thumb rest (18). This leaves the thumb of the right hand available as another playing finger. As a result, the right hand of the player can assume new positions, thus allowing new playing techniques.

It is understood that the examples of embodiments described can be modified in different ways within the scope of the inventive concept. For example, the plate (8) can be made smaller or larger than shown in the figures. Furthermore, the connector between the device (13) and the saxophone (30) can be designed differently. Current technology offers numerous well-known connectors that provide a secure and firm connection on the one hand, and can be disconnected quickly by means of a specific handle or application of a certain force, on the other. Possible connectors are shown in FIGS. 8 to 10.

Figure 8:
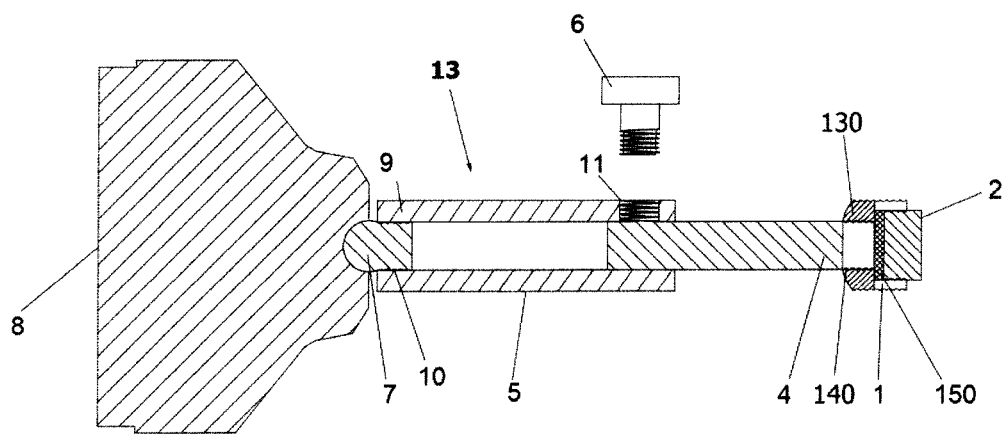
FIGS. 8 to 10 show a sectional view of the device.

According to FIG. 8, however, a telescopic connection is provided by means of a rod (4) and a tube (5) between the plate (8) and the bumper adjustment screw adapter (1). The rod (4) is now positioned with the bumper adjustment screw adapter (1) just like with certain types of bits in a screwdriver that have a hexagonal cross-section and can be inserted into a hexagonal opening. The rod (4) features a hexagonal cross section (130) on its first end, while the bumper adjustment screw adapter (1) has an inner hexagonal cross-section (140). A connector with square cross-sections is also conceivable. In addition, in the case of a bumper adjustment screw adapter (1) with an inner hexagonal cross-section, a magnet (150) is provided to hold the device in the bumper adjustment screw adapter (1). As a result, the device (13) can be removed from the saxophone (30) as needed, while the bumper adjustment screw adapter (1) remains in the Eb key guard (14).

Figure 9:
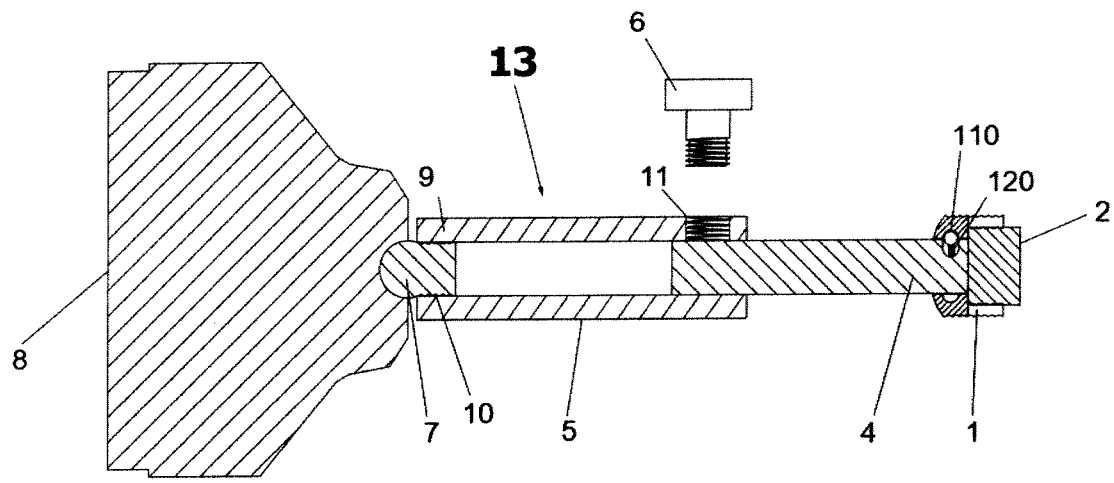

According to FIG. 9, the rod (4) has a ball (110) at its first end that can press against the pressure of a spring inside a cavity in the rod (4) in order to form a snap-in element that can snap into a groove (120) in the bumper adjustment screw adapter (1).

Figure 10:
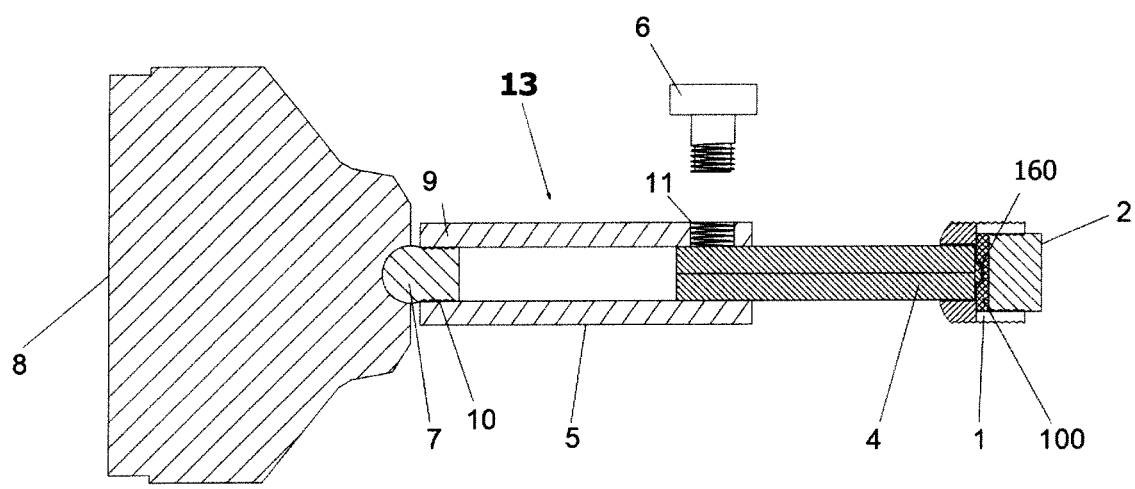

According to FIG. 10, the bumper adjustment screw adapter (1) once again features a magnetic disk (100), which attracts the front side of the rod (4) analogously to the embodiment of FIG. 8, provided that the rod (4) is metallic, wherein a projection (160) that fits into a hollow of the magnetic disk (100) is also formed on the first end of the rod (4).

With the saxophone playing aid, we avoid all the above-mentioned disadvantages:

The saxophone (30) no longer comes into contact with the body except through the saxophone playing aid.

Thanks to the attachment of the device (13) by means of a bumper adjustment screw adapter (1) instead of the original bumper adjustment screw (15), all muffling, all the corpus resonance problems, and especially the intonation problems of the Eb key or the Eb tone (16) are thereby eliminated.

The entire saxophone resonates much more freely and without any muffling; in addition, the tones become more responsive, especially in the low register.

The sound becomes more balanced throughout the entire register.

The right hand and the muscles of the right arm are released and relieved.

The thumb hook (18) should only serve as a posture orientation, since it is no longer needed to hold the instrument and the thumb itself is relieved considerably, which in turn promotes flexibility in the remaining fingers of the right hand.

The thumb of the right hand is therein freed up and made available as another playing finger. The right hand of the player can therefore assume new positions, thus allowing new playing techniques.

Thanks to the saxophone playing aid, the entire posture of the saxophonist becomes more upright and more ergonomic. The head and shoulders can remain in an upright and straight position, the feet stand at about shoulder width apart, and the energy can flow freely due to the fact that the weight of the instrument is no longer shifted onto the foot or abdominal area at hip level.

The left arm is also released and relieved, since it is no longer necessary to buttress the saxophone (30) continuously forward with the left thumb over a thumb rest in order to press the saxophone (30) against the upper front teeth, as with conventional saxophone holding techniques. This invention makes this pressure of the left thumb unnecessary, by permanently releasing and relieving the left thumb, since the forward pressure which is usually necessary, is now largely compensated for by the device itself (13).

The invention claimed is:

1. Device (13) for supporting a saxophone (30) on the body of a player, comprising a rod (4) whose first end has a mechanical adapter for connection to the saxophone (30), characterized in that the mechanical adapter comprises an adjustment screw adapter (1) that provides a detachable connection to the first end of the rod (4), wherein the adjustment screw adapter (1) is connectable to an Eb key guard (14) on its end facing away from the end of the rod (4) and has a bumper pad (2) on its end facing away from the end of the rod (4) as impact protection for mechanical parts of the saxophone (30), and wherein a second end of the rod (4) is connected to a plate (8) via a ball joint or a universal joint (7).

2. Device (13) according to claim 1, characterized in that the mechanical adapter has an external thread by means of which the device (13) can be connected to an internal thread of the bumper adjustment screw adapter (1) of an Eb key guard (14) of a saxophone (30).

3. Device (13) according to claim 1, characterized in that the mechanical adapter is designed as a plug by means of which the device (13) can be connected to a corresponding connector socket of the bumper adjustment screw adapter (1) of the Eb key guard (14) of a saxophone (30).

4. Device (13) according to claim 3, characterized in that the plug and/or the bumper adjustment screw adapter (1) has a magnet.

5. Device (13) according to one of claims 1 to 4, characterized in that the rod (4) is inserted into a tube by sliding (5), wherein the position of the rod (4) within the tube (5) can be fixed in place with a clamping screw (6) that is attached to the tube (5) to produce a telescopically adjustable connection between the plate (8) and the mechanical adapter.

6. Device (13) according to one of claims 1 to 4, characterized in that the plate (8) has a support pad, which preferably consists of felt, rubber, silicone, or a mixture thereof.

7. Device (13) according to one of claims 1 to 4, characterized in that the bumper pad (2) consists of felt.

\* \* \* \* \*